Patented Nov. 4, 1924.

1,514,509

UNITED STATES PATENT OFFICE.

CARLETON ELLIS, OF MONTCLAIR, NEW JERSEY.

SYNTHETIC IVORYLIKE PRODUCT AND METHOD OF MAKING SAME.

No Drawing.   Application filed May 17, 1922.   Serial No. 561,719.

*To all whom it may concern:*

Be it known that I, CARLETON ELLIS, a citizen of the United States, and a resident of Montclair, in the county of Essex and State of New Jersey, have invented certain new and useful Improvements in Synthetic Ivorylike Products and Methods of Making Same, of which the following is a specification.

This invention relates to a product resembling ivory, bone, horn and the like and relates especially to an artificial ivory (or ivory substitute, which terms are used, hereinafter, as synonymous) which may be cast in molds to yield articles of specific shapes.

The composition is made by reacting with an alkali on a syrupy substance capable of setting in the presence of such alkali to form a solid product of a degree of hardness and toughness depending on the conditions of preparation. Such a syrupy substance may be produced in various ways as for example by the action of formaldehyde on acetone.

When acetone and formaldehyde are brought together in the presence of a strong alkali a resin is produced which has a strong red or orange color. This discoloration is difficult if not impossible to remove and thus would render such a resinous product incapable of application in the production of material to substitute for ivory. When acetone and formaldehyde in equimolecular proportions are reacted upon slowly in the presence of a milder alkali the substance keto butyl alcohol is supposedly obtained. Formaldehyde also reacts upon acetone to yield various other compounds and in the present procedure I prefer to employ about two molecules of formaldehyde to one molecule of acetone.

As any alkaline catalytic or activating agent which will produce a red colored substance is not desired in the production of artificial ivory I prefer to use selected alkaline material as for example trisodium phosphate. If not used in excessive amounts or the heating is not unduly protracted this compound causes a vigorous reaction between for example paraform and acetone resulting in a syrup of great body or consistency which retains a water white color or at the most only a very faint yellowish tinge. In fact the reaction may be carried so far that the product will scarcely flow from a container or will be even nearly solid. This material if the reaction has not been carried beyond a certain point is miscible with water and caustic alkali may be introduced in the form of a concentrated aqueous solution and thoroughly mixed with the syrup thus affording a quantity of catalytic agent quite uniformly distributed which will serve to carry out the subsequent hardening operation.

In this condition the material is ready to be cast. If such a quantity of catalyzer is present as will quickly bring about spontaneous reaction, the syrup with its added catalyzer is kept chilled to prevent the exothermic reaction taking place with the resultant formation of a spongy hard solid.

The cold material is poured into a mold, the latter closed and spontaneous reaction with evolution of heat allowed to take place. If desired the reaction may be hastened by externally applied heat. This may be desirable when using molds of massive construction.

The following will serve as an illustration of one method of procedure but is not to be construed as setting forth details which must necessarily be followed in every case.

Paraform generally speaking gives lighter products than aqueous formaldehyde and therefore has a decided advantage in making products of a white or cream colored tint which resemble ivory.

Example: 200 grams of pure trisodium phosphate is treated with 200 c. c. of water, 2 kilos each of paraform and acetone mixed therewith. On gently warming to start the reaction a vigorous ebullition sets in with evolution of heat. The heating agent is quickly withdrawn and the reaction allowed to progress without further external heating. Owing to the violence of the reaction a large reflux condenser should be used or the reaction carried out under pressure. Glass or enamel lined vessels are preferred for the purpose.

In spite of the vigor of the reaction and the evolution of heat the product obtained is a practically colorless solution of the compound formed by the union of the paraform and acetone dissolved in any excess of acetone. It may be decanted or filtered to remove the trisodium phosphate which is not dissolved in the product. It then may be dried as for example by heating to 70 or 80° C. in a vacuum pan for 6 hours at 25" gauge vacuum.

The heavy clear almost water white syrup obtained in this manner is then ready to be admixed with caustic alkali to form the white hard material. If the caustic alkali had been mixed with the paraform and acetone in any substantial quantity to take the place of the trisodium phosphate used in the first stage of the procedure a red resin would have resulted. However by first forming the syrupy compound of acetone and paraform as a colorless product and adding caustic soda thereto under regulated conditions the red resin does not form but instead a very light colored substance is obtained which in one stage is quite rubbery and which may be produced as a tough white substance not resembling resin but rather comparable with ivory, horn, bone and the like.

Procedure of casting. 300 grams of the heavy syrup are treated with 30 c. c. of a strong aqueous solution of caustic potash made by dissolving 75 grams of caustic potash in water and making up to 100 c. c. by volume. The syrup is kept cool by a jacket of cold water, ice bath and the like. The caustic potash solution is added 10 c. c. at a time and the temperature will rise about 10 degrees for each 10 c. c. added. The syrup is stirred thoroughly as the catalyzer is introduced because it is important to have a uniform distribution of the catalyzer if a uniform appearing solid is to be obtained. The final temperature should best not exceed 20 to 30° C. when the syrup is ready to put into mold.

A casting was made in this manner. A pipe about six inches long and one and one-half inches in diameter was bored to a slight taper and flanged at either end. In one of the flanges a small plug was set to be used as a means of filling. The mixture produced as above was allowed to stand a brief time to permit bubbles to rise to the surface, the mixture being kept cool meanwhile, it was then poured into the mold and the plug screwed in. On standing in the mold for 10 minutes the mold became quite hot but as it was constructed with heavy flanges the ends of which were capable of absorbing a good deal of heat the mold was placed in an oven at 120° C. for one hour.

At the end of this time the mold was opened and a hard cylinder creamy white in color was easily removed from the mold. Its weight was 237 grams, not all of the 300 grams of syrup taken having been used in filling the mold. The shrinkage was found to be very slight. The product buffed readily to an opaque product of the gloss and color of polished ivory.

The opacity is largely due to the water introduced or formed during the reaction. By cutting down the amount of water the opaque material gradually becomes translucent or transparent. The pressure produced during the reaction is considerable and a small amount of the material was forced between the flanges and into the bolt holes. Pieces chipped out from the bolt holes were found to be very hard and free from bubbles due no doubt to the extruding process to which they had been subjected.

The material extruded from the mold and lodged between the planed surfaces of the flanges could be readily stripped from the flanges and was in the form of a flexible almost transparent film which was not brittle such as would be the case with a resinous substance but which could be bent to and fro without breaking. Its strength was good and it was not disintegrated on boiling in water.

The cast material also resembles celluloid that is produced in imitation of ivory, it has one advantage among others over celluloid that it is not inflammable like the latter. A rod of the ivory substitute made according to my invention may be placed in a Bunsen flame and will simply char without burning vigorously. While made of organic material and therefore combustible just as wood and various other substances will burn, it has no inflammable qualities like celluloid. Furthermore it does not melt in the flame but is infusible or practically not softened by the flame, fragments of the material held in the flame charring without losing their shape or without much intumescence. The quantity of water present in the cast composition also reflects on its behavior when placed in the Bunsen flame it being less combustible when a great amount of water is present but also tending to more easily blister due to the escape of moisture.

The casting procedure above described and which forms a part of the present invention enables ivory or celluloid substitutes of great size to be cast instead of employing the expensive method of carving required in the case of ivory or of building up blocks of celluloid by superposing sheets of celluloid and cementing together. Besides this there is not the danger from fire which would occur in the use of large masses of celluloid.

While the present invention involves particularly the production of cast materials without the addition of any filling or extending substance it will be understood that it is possible to add various fillers or extenders such as those commonly used in the molding field; with this consideration in mind namely that fillers of an acid nature which would destroy the action of the catalyzer are not recommended unless their deleterious effect is in some way compensated for.

If extending material is to be used in the production of artificial ivory I prefer to add some material which does not render the product too opaque. Ivory has a certain translucency which would not be duplicated by adding fillers such as zinc oxide, white lead or other strong white pigments although these may be used in some cases where the quality of ivory is not particularly desired. Extenders which have poor hiding or covering power such as whiting, magnesium oxide or carbonate, barytes and the like may be used. In other cases fibrous fillers such as asbestos, flock or other fibrous material may be utilized. Wood flour may be used in some cases although it has a tendency to neutralize the catalyzer and additions of wood flour probably call for compensating treatment. However I shall not catalog a long list of fillers the use of fillers being so well known in the molding art. The particular point to bear in mind is that the filler added should not be incompatible with the catalyzer.

Dyes or coloring agents also may be introduced and cast products may be obtained by intermixing different colored syrups in such a manner that the mixture will set to a hard mass without thorough diffusion so that striated or mottled products may be obtained.

Such procedures are used only in special cases the particular object of the present invention being to produce a substance considerably resembling ivory, that is having the color and slight translucency of ivory which may be obtained in the form of cast articles or in slabs, cylinders etc. capable of being turned or machined to any desired article such as are now made from ivory, celluloid and the like.

The machining which would be dangerous in the case of celluloid may be carried out readily in the handling of my product.

While I particularly mentioned acetone and formaldehyde I may in some cases also make the solid material from certain other ketones as for example methyl ethyl ketone or cyclohexanone, or I may use other aldehydes than formaldehyde or paraform as for example acetaldehyde.

However not all ketones and aldehydes condense to form a product such as I have described the reaction between ketones and aldehydes producing all kinds of compounds ranging from thin liquids to hard resins and the like. I call herein for only strict equivalents of the substances which bring about the reaction to yield the hard substances of the present invention which preferably are infusible, preferably insoluble in water and various organic solvents, preferably white or very light in color and preferably hard and fairly tough, preferably transparent or translucent or if opaque possessing a certain depth or slight degree of translucency.

In place of caustic soda or caustic potash used as activating material I may employ substances such as metallic sodium or metallic potassium, sodium amide or hydride, hydrone and various other substances capable of generating a strong alkali which will bring about the rapid setting quality desired.

Likewise in place of trisodium phosphate I may use substances having the same degree of activity in bringing about reaction between acetone and formaldehyde for example a very small proportion of caustic soda insufficient to develop a red resin.

By having only a small amount of water present and by not paying the same great care to the maintenance of a white product an "off-colored" material may be obtained resembling amber or cloudy amber from which various articles may be fabricated.

It is also possible where dark color is no objection to make castings of a red color by employing a cruder method of procedure. For example the first stage of the reaction may be carried out with sodium carbonate in place of trisodium phosphate with vigorous heating to produce a red colored syrup which on treating with caustic alkali and casting will yield a red product. Generally speaking however such products containing the red coloring matter represent a form of procedure that does not afford as tough or desirable an article as that made by the procedure yielding the white or light colored product. It is possible that the embrittling effect of a certain amount of red resin present in the dark colored composition manifests itself disadvantageously. However I do not limit the present invention in such a manner as to exclude the less favorable composition.

Further I may add that reaction between one equivalent each of acetone and formaldehyde carried out in such a manner as to produce keto butyl alcohol is not as desirable as reaction with a larger proportion for example two equivalents of formaldehyde employed as paraform to one equivalent of acetone or methyl acetone. The nature of the reaction product obtained by treating a ketone and an aldehyde depends so largely on proportions, temperature, pressure, proportion and character of activating agent and time of treatment that any substantial variation in some cases may cause quite different products to be obtained and I have described the procedure of the present invention in very great detail, not for the purpose of limiting myself thereto but to provide a working procedure which will adequately illustrate the process and from which various deviations or modifications may be made in the light of the present disclosure but which will not depart therefrom in spirit and I embrace herein such equivalent procedures or modifications.

In the second stage of the procedure, that is the casting operation per se while I prefer to use caustic alkali added in aqueous solution I may also use other solvents such as glycerine, methyl or ethyl alcohol and the like or may simply dissolve the caustic alkali in the syrup which however is a slow operation and involves a certain risk of reaction going on to an undesirable extent prior to introduction of the composition into the mold.

I may add that it has been proposed to make white products from the condensation substances derived from phenol and formaldehyde. I understand however that owing to the discoloring action due to the presence of the phenolic substance a gradual discoloration goes on resulting in an article of reddish color after it has been exposed for a considerable time. In the present case this does not occur as the effect of sunlight, exposure etc., if it causes any effect whatsoever is rather more that of that slight change of color which occurs in ivory, bone and the like. This is an advantage over substances made from condensation products which change from white to pink or red in the course of a short time.

I may further add that in the preparation of the white syrupy compound if vacuum distillation is employed, as is desirable, any excess of acetone or formaldehyde not taking part in the reaction may be recovered and utilized in subsequent operations. In like manner if any solvent is employed or is present in the acetone, methyl acetone or other raw material used this likewise may be recovered. In forming a syrupy compound from methyl ethyl ketone a light volatile product insoluble in water is obtained and this may be separated and used for other purposes.

In using a high proportion of alkaline catalyst in making the mix for molding, the composition is very sensitive to heat and even though the latter may be well chilled if it is poured into a mold which is warm or even at room temperature the mixture may react foaming up into a voluminous spongy white mass before the mold has received its full charge. Hence it is desirable to refrigerate the composition and also the mold when the proportion of catalyst is so high as to bring about a very sensitive reactive mixture. A flowable or fluent composition is desired which will penetrate to all parts of the mold. Also for commercial requirements it should be capable of quickly setting once it is charged into the mold and the latter has been closed. The speed with which the hardening reaction or thermo-setting, as it may be called, takes place is an important consideration for on it is dependent the number of molds required. A composition which will become thermo rigid (i. e. retaining its shape when heated) in a few minutes' time, merely by warming the cold mold to start the reaction, is desired. Hence the proportion of catalyzer preferably is high but no limitation is expressed herein as to such proportion it being understood that with diminished amounts of catalyzer the time of molding or curing may become more protracted. In fact with a small amount of catalyzer and especially without the introduction of water or with the use of only a minimum amount of water protracted baking may be required at from 100–150° C. in order to slowly harden the composition in the mold and produce clear, amber-like products suitable for making cigarette holders, pipe stems, umbrella handles and the like.

The preferred steps of making the ivory, horn or celluloid substitute are therefore as follows:

1. Preparation of the syrupy base or gum.
2. Cooling the syrupy material.
3. Cooling the catalyst solution.
4. Cooling the mold.
5. Admixing the catalyst with the syrup.
6. Adding extending material if the latter is required.
7. Settling under refrigerating conditions in order to permit air bubbles to escape.
8. Pouring into the mold.
9. Warming the mold to start the reaction and maintaining external heat if necessary.
10. Preventing too high a temperature such as would cause discoloration.

The syrup may be placed in a heavy mixing machine such as a Werner-Pfleiderer mixer equipped with a cooling jacket through which cold water or refrigerated brine may be passed. The catalyst solution is preferably cooled in a suitable manner. It is preferably added slowly in a thin stream to the syrup while the latter is being churned in the cooling mixer. As the mold unless cooled may start the reaction prematurely, especially in summer heat, the mold also may be suitably cooled. In admixing the catalyst with the syrup I prefer to keep the temperature below 20° C. in fact to have the temperature as low as possible without having the syrup thickened too greatly because of the cold, to preclude perfect mixing. In the illustration given above involving the handling of a comparatively small quantity of the material a higher final temperature before discharging into the mold was stated. For manufacturing conditions on a larger scale where the reaction might quickly become uncontrollable it is better to have the temperature well below the safety limit. This of course depends to some extent upon the proportion of catalyzer introduced.

In churning the syrup to incorporate the catalyzer uniformly bubbles will form and while if small they do little or no harm it is desirable to permit the larger bubbles to escape and for material which is to be made especially clear a vacuum may be applied to the cold mixture to assist in the elimination of bubbles. This may be used for example in making a mix for the production of flexible films.

The charge of material may therefore be withdrawn from the mixer into a refrigerated settling receptacle and from this may be run into molds. After the mold is charged and closed the mold may be warmed as for example by placing in an oven to start the reaction. If the oven temperature is from 100–120° C. it will usually not endanger the color if the mold is allowed to remain in the oven for a period of fifteen minutes or longer.

If the molded base is found to be red or brown in color this is due to too much catalyst or too high a temperature during the setting period and conditions should be adjusted with reference to the proportion of catalyst and the temperature to preserve the white or creamy ivory appearance when the latter is especially soft.

What I claim is:—

1. The process of making cast articles resembling ivory which comprises reacting on acetone and formaldehyde in the presence of a compatible alkaline activating agent to form a syrup, admixing the syrup with aqueous caustic alkali while cooling the composition, introducing the latter into cold molds and allowing spontaneous reaction to take place to form a cast article.

2. The process of making cast articles resembling ivory which comprises treating a reactive ketone with formaldehyde in the presence of a compatible alkaline activating agent to form a white syrup, admixing the syrup with aqueous caustic alkali while cooling the composition, introducing the latter into molds and allowing spontaneous reaction to take place to form a cast article.

3. The process of making cast articles resembling ivory which comprises reacting on acetone and formaldehyde in the presence of a compatible alkaline activating agent to form a syrup free from red color, admixing the syrup with aqueous caustic alkali while cooling the composition, introducing the latter into cooled molds and allowing spontaneous reaction to take place to form a cast article.

4. The process of making cast articles resembling ivory which comprises reacting on acetone and formaldehyde in the presence of a compatible alkaline activating agent to form a syrup, admixing the syrup with caustic alkali while cooling the composition, introducing the latter into molds and allowing spontaneous reaction to take place to form a cast article.

5. In the process of making cast articles the step which involves mixing strong alkaline catalytic material with syrupy material obtained from acetone and formaldehyde and in permitting the composition to set in a closed mold.

6. In the process of making white cast articles the step which involves mixing strong alkaline catalytic material with white syrupy material obtained from acetone and formaladehyde and in permitting the composition to set in a closed mold.

7. In the process of making cast articles the step which involves mixing strong alkaline catalytic material with syrupy material obtained from a reactive ketone and formaldehyde and in permitting the composition to set in a closed mold.

8. In the process of making cast articles the step which involves mixing strong alkaline catalytic material with syrupy material obtained from a suitable reactive ketone and an aldehyde and in permitting the composition to set in a closed mold.

9. As a new article of manufacture a cast product resembling ivory formed from an alkaline syrup containing the products of reaction of acetone and formaldehyde.

10. As a new article of manufacture a cast product resembling ivory formed from an alkaline syrup containing the products of reaction of a suitable ketone and formaldehyde, such product containing a sufficient amount of water to render the same of about the color and degree of opacity of ivory.

11. As a new article of manufacture a cast product resembling ivory formed from an alkaline syrup containing the products of reaction of acetone and a suitable aldehyde.

12. As a new article of manufacture a cast product resembling ivory formed from an alkaline syrup containing the products of reaction of a suitable ketone and a suitable aldehyde, in the ratio of about one molecule of the ketone to two of the aldehyde.

13. A cast product of organic constitution having the appearance of ivory being substantially infusible, substantially unaffected by organic solvents and charring slowly when placed in a hot flame, such products consisting essentially of condensation products of ketones with aldehydes both belonging to the fatty series.

14. A cast product of organic constitution having the appearance of ivory being substantially infusible, substantially unaffected by organic solvents, charring slowly when placed in a hot flame and not reddened by the action of light, such products consisting essentially of condensation products of ketones with aldehydes both belonging to the fatty series.

15. A white substantially opaque cast product of organic constitution being substantially infusible, substantially unaffected by organic solvents and charring slowly when placed in a hot flame.

16. A cast condensation product of an aldehyde and a ketone, which is substantially infusible, substantially unaffected by organic solvents and charring slowly when placed in a hot flame.

17. The process of casting heat sensitive organic compositions requiring the addition of a catalyzer to react, which mixture of organic composition will set to a hard mass when warmed up, which comprises adding the catalyzer to a chilled fluent composition, mixing and pouring into a chilled mold.

18. In the art of making cast articles, the step which involves mixing a catalytic material comprising a fixed caustic alkali, with an entirely liquid, but highly viscous condensation product of a ketone and an aldehyde, both of the fatty series, such mixture being free from solid filling material, and thereafter permitting the composition to set in a closed mold.

19. In the manufacture of hard insoluble infusible condensation products from formaldehyde and acetone, the improvement which comprises treating a thick syrupy condensation product of these materials, which is readily soluble in water, with a small proportion of a caustic alkali as a condensing agent.

20. In the manufacture of hard insoluble infusible condensation products from formaldehyde and acetone, the improvement which comprises treating a thick syrupy condensation product of these materials, and containing the reaction product of about two molecules of formaldehyde to one of acetone, and which product is readily soluble in water, with a small proportion of a caustic alkali as a condensing agent.

21. In the manufacture of hard insoluble infusible condensation products from formaldehyde and acetone, the improvement which comprises treating a thick syrupy condensation product of these materials, which is readily soluble in water, with a small proportion of a caustic alkali as a condensing agent, and heating in a mold under pressure.

22. A process which comprises adding to a syrupy condensation product, capable of conversion into a hard resin, an aqueous solution of a catalyst, such operation being conducted at a low temperature, placing the mixture in a pressure-tight mold, and heating the same, whereby condensation is effected and a hard molded product produced.

CARLETON ELLIS.